United States Patent [19]

Gruber

[11] Patent Number: 5,195,880
[45] Date of Patent: Mar. 23, 1993

[54] ECCENTRIC SCREW PUMP WITH REVERSIBLE ROTOR

[75] Inventor: Heinz Gruber, Seesen/Rhüden, Fed. Rep. of Germany

[73] Assignee: GD-Anker GmbH, Seesen/Rhüden, Fed. Rep. of Germany

[21] Appl. No.: 477,971

[22] PCT Filed: Sep. 30, 1988

[86] PCT No.: PCT/DE88/00599
§ 371 Date: May 29, 1990
§ 102(e) Date: May 29, 1990

[87] PCT Pub. No.: WO90/03521
PCT Pub. Date: Apr. 5, 1990

[51] Int. Cl.$^5$ .......................... F04C 2/107; F04C 5/00; F16D 1/10; F16D 3/10
[52] U.S. Cl. ........................................ 418/5; 418/39; 418/48; 418/182; 403/3
[58] Field of Search ................. 418/39, 48, 182, 5; 464/154, 158; 403/3, 4

[56] References Cited

U.S. PATENT DOCUMENTS

| 1,287,030 | 12/1918 | Jones | 464/158 |
| 4,711,006 | 12/1987 | Baldenko et al. | 418/48 |

FOREIGN PATENT DOCUMENTS

| 0184938 | 6/1986 | European Pat. Off. | |
| 1553199 | 1/1971 | Fed. Rep. of Germany | |
| 2342819 | 2/1975 | Fed. Rep. of Germany | 418/48 |
| 3304751 | 8/1985 | Fed. Rep. of Germany | |
| 3538950 | 6/1986 | Fed. Rep. of Germany | |
| 3621967 | 1/1988 | Fed. Rep. of Germany | |
| 3834106 | 4/1990 | Fed. Rep. of Germany | 418/39 |
| 2633673 | 1/1990 | France | 418/48 |

*Primary Examiner*—John J. Vrablik
*Attorney, Agent, or Firm*—Michael J. Striker

[57] ABSTRACT

An eccentric screw pump comprises at least one stator, a rotor having a core and received for eccentric rotation in the stator, a first coupling device adapted to connect one end of the rotor to a drive system, a second coupling device provided at another end of the rotor, the coupling devices having external dimensions which are smaller than a diameter of the core of the rotor.

6 Claims, 5 Drawing Sheets

ECCENTRIC SCREW PUMP WITH REVERSIBLE ROTOR

The invention relates to an eccentric screw pump.

Eccentric screw pumps are known as distribution or conveyor devices for abrasive solid-liquid mixtures, such as for example slurries, mortar and the like. Their essential feature is a rotor which rotates eccentrically within a cylindrical stator, with the rotor being designed as a screw conveyor, and wherein delivery chambers are formed between the threaded internal profile of the stator and the screw profile, said delivery chambers moving in the longitudinal direction of the stator as a result of rotation of the rotor. The volume of these delivery chambers remains constant during the movement along the stator—the volume changes only in respect of position and shape. One can regard the space defined between two thread turns of the screw helix and the internal profile of the stator—in relation to the rotor—as being one such delivery chamber so that one has one or more stages, according to the number of thread turns of the screw conveyor, in which stages the pressure of the medium delivered by the respective stages can increase in the output direction The driving of the eccentric screw pump is effected in the conventional way by means of a universal-joint shaft coupled to the rotor and by means of which the eccentricity of the rotor can be balanced.

In the transportation of for example mortar and other such matter laden with abrasive components, increasing amounts of wear occur in the chambers with increasing pressure, with the wear occurring both on the rotor and also on the stator Therefore, in the course of time, this leads to a tapering erosion of the profile of the conveyor screw, so that finally one no longer has a sufficient seal between the various stages and one has at least partial backflow of the matter being conveyed, so that the efficiency of the conveyor, particularly in terms of the achievable conveyor height and output pressure, becomes insufficient.

Although the manufacturing cost of a rotor is on average five times that of a stator, the majority of the measures adopted until now and directed to increasing the life of the eccentric screw pump, have been expended on the stator whose shape has been changed in accordance with the progressive wear.

Thus, for example, DE-AS 1 553 199 described an adjustable stator for an eccentric screw pump which is designed as a resilient, double-turn or multi-turn hollow screw which is arranged within a longitudinally slotted tubular sleeve which is extensible by means of an adaptor sleeve. By a tightening of the tubular sleeve one can compensate, within certain limits, for a change in the geometry of the rotor.

A further variant, likewise associated with this technology, is known from DE-PS 33 04 751. According to this, a rotor which has a constant thread cross-section throughout the length of the pump is located within a stator whose cross-section reduces continuously from the input suction side through to the output pressure side, so that the mechanical stress imposed on the rotor increases correspondingly at the output side, namely at the position at which the maximum wear is expected.

It is characteristic of these known eccentric screw pumps that an unbalanced rotor which becomes worn that is in the output side region must be discarded, since because of the dimensions of the universal-joint head connected in a driving manner to it, a reversed setting of the rotor in the stator is not possible. Consequently, in spite of the aforementioned cost relationship between the rotor and the stator, in practical use there is insufficient, construction-related utilisation of the rotor.

Screw conveyors are conventionally formed with several stages, in order to be able to achieve a predetermined delivery height. Since the pressure increase which can be achieved per stage is limited, as a consequence the achievable delivery height and the achievable output pressure are determined essentially by the number of stages. Screw conveyors can be manufactured quickly and at favourable cost by means of the known technology of the threaded screw. More difficult however is the manufacture of long, comparatively thin screw profiles with a large number of stages, in which this technology requires more complex shapes, because of the insufficient mechanical stability of the screw profile among other things.

Consequently, these known eccentric screw pumps, with regard to the cost situation of the rotor, especially with large delivery heights and high output pressures, cannot be regarded as sufficiently cost-effective in terms of resistance to wear.

SUMMARY OF THE INVENTION

It is the object of the invention to provide an eccentric screw pump of the type first referred to above, with an improved life for the rotor, so that its suitability for the transportation of abrasive matter in particular, over large delivery heights, is improved.

In keeping with these objects and with others which will become apparent hereinafter, one feature of the present invention resides, briefly stated, in an eccentric screw pump comprising at least one stator and a rotor which is received for eccentric rotation in the stator and which is connected at one end to a drive system by means of a coupling device, wherein the rotor is provided at both ends with such coupling devices whose external dimensions are smaller than the core diameter of the rotor.

It is essential to the invention that, because of the special design of the free ends of the rotor, the rotor can be inserted into a stator in either direction, so that with wear occurring at one end, namely on the output side, the worn region of the rotor can be replaced in the input-side region of the stator, which in many cases is operated substantially without pressure, so that even though in this region a worn rotor portion is introduced, substantially no adverse effect on the efficiency of the conveyor is to be expected. On the other hand, at the output side, practically the necessary pressure can be created since here an unworn section of the rotor now comes into use.

In this way, the original tapering by worn rotor is inserted again in the reverse direction to this taper, until in the final state the original taper is reduced and the rotor then is uniformly worn over its entire length. It is assumed for this mode of using the rotor that the rotor can be inserted axially in spite of the coupling devices fitted at the ends. The latter is achieved by the external dimensions of the coupling devices being smaller than the core diameter of the rotor. The rotor now uniformly worn over its full length, after having been inserted in the reversed sense, can basically be inserted into a stator which is smaller in dimensions, in dependence upon the degree of the wear. This is always possible in the circumstance in which the layer of the rotor hardened on the surface region has not been completely worn away. Consequently, the rotor, in a smaller dimensioned stator, can be worn again at both ends in the sense described above.

In accordance with another feature of the present invention, the coupling devices can have square profiles or profiles of some other polygonal cross-sections, with their central axes extending coaxially in relation to the longitudinal center axis of the rotor.

The shaping of the coupling devices, for example with square profiles, whose central axes extend coaxially in relation to the longitudinal central axis of the rotor, is very easily produced from the technical manufacturing point of view and they can be manufactured particularly favourably in terms of cost. The coupling of a drive system to the square profiles can be effected basically in any suitable manner.

Still another feature of the present invention is that at least two stators are connected end to end sealingly to one another, and the coupling devices which mutually opposed each other in the connecting regions of the stators are in engagement with each other.

The compound system, consisting of stator and rotor, is conventionally manufactured with a limited number of stages, so that, by means of this, a very simple possibility is opened up of being able to produce a high pressure pump arrangement in which in each stator there is inserted a rotor which is equipped at both ends with coupling devices, for example having square profiles. These coupling devices are shaped in such a manner that they can easily be brought into engagement with each other. In the case of square profiles this can be achieved in a particularly simple manner by a sleeve which is appropriately shaped on the inside. Because multi-stage rotors suitable for high pressure pumps are regarded as expensive, one can in this way, by means of the eccentric screw pump of the present invention, by using simple technical measures, produce a wide variety of high pressure pump arrangements of various numbers of stages using only a few standard sizes. This can be achieved by mere combination of three-stage or four-stage screw pumps which can each be manufactured inexpensively and which are designed in the manner described above. From the practical point of view, in this way one achieves not only a high pressure pump which is particularly resistant to wear but also a pump whose number of stages can be adapted in the simplest manner to the particular needs, for example different delivery heights.

Still a further feature of the present invention is that the coupling of the coupling device to the drive system is effected by means of a square cross-section socket mounted rotatably about a shaft extending at a small angle of inclination relative to the longitudinal central axis of the rotor, and the eccentricity of the rotor is compensated by the socket being oversized in relation to the coupling device.

These features open up a simple possibility of coupling a centrally rotating drive system to the eccentrically rotating rotor. It is this coupling of a drive system to the square profile connected to the rotor which is in practice possible, since—seen in the direction of flow of the matter being conveyed—the eccentric screw pump often is preceded by a comparatively long intermediate shaft by means of which the coupling to a motor is effected. With an eccentricity of 1 cm to 2 cm of the rotor, the length of this intermediate shaft serving to couple the shaft to a mixing device or feed device of known form can amount for example to 50 cm so that a correspondingly smaller pivot angle of the intermediate shaft relative to the longitudinal central axis of the rotor results.

Various embodiments of eccentric screw pump in accordance with the invention will now be described by way of example and with reference to the accompanying drawings, in which components having the same function are indicated by the respective same reference numbers.

DESCRIPTION OF PREFERRED EMBODIMENTS

Figure 1:
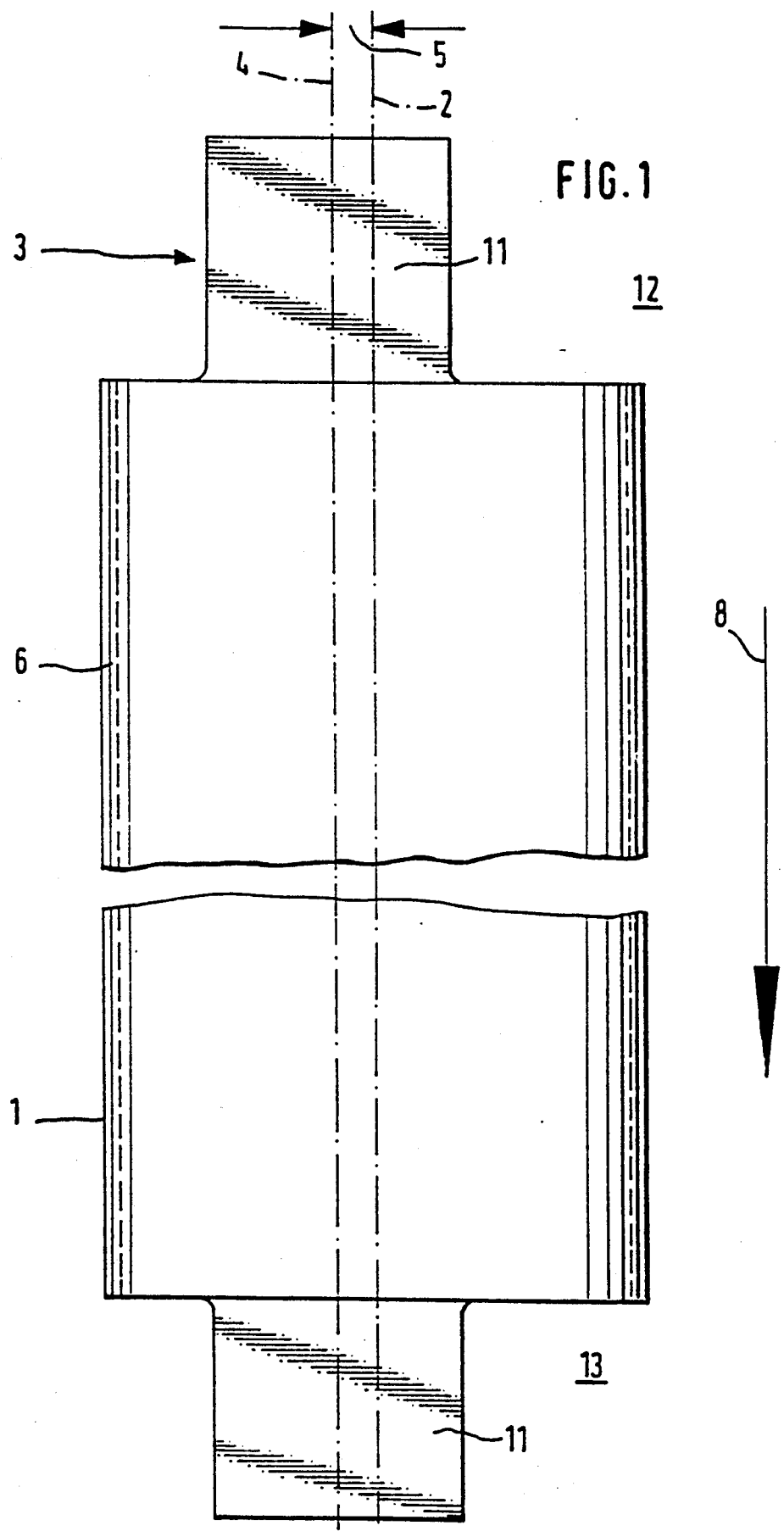
FIG. 1 is a side view of an eccentric screw pump in accordance with the invention.

At 1 in FIG. 1 is indicated the cylindrical housing of an eccentric screw pump, about whose longitudinal central axis 2 a rotor 3, whose longitudinal central axis is indicated at 4, is mounted in a manner known per se for rotation eccentrically with the offset 5. During the rotation of the rotor 3 its longitudinal central axis 4 consequently describes a cylindrical surface centered on the longitudinal central axis 2 of the housing 1.

Figure 2:
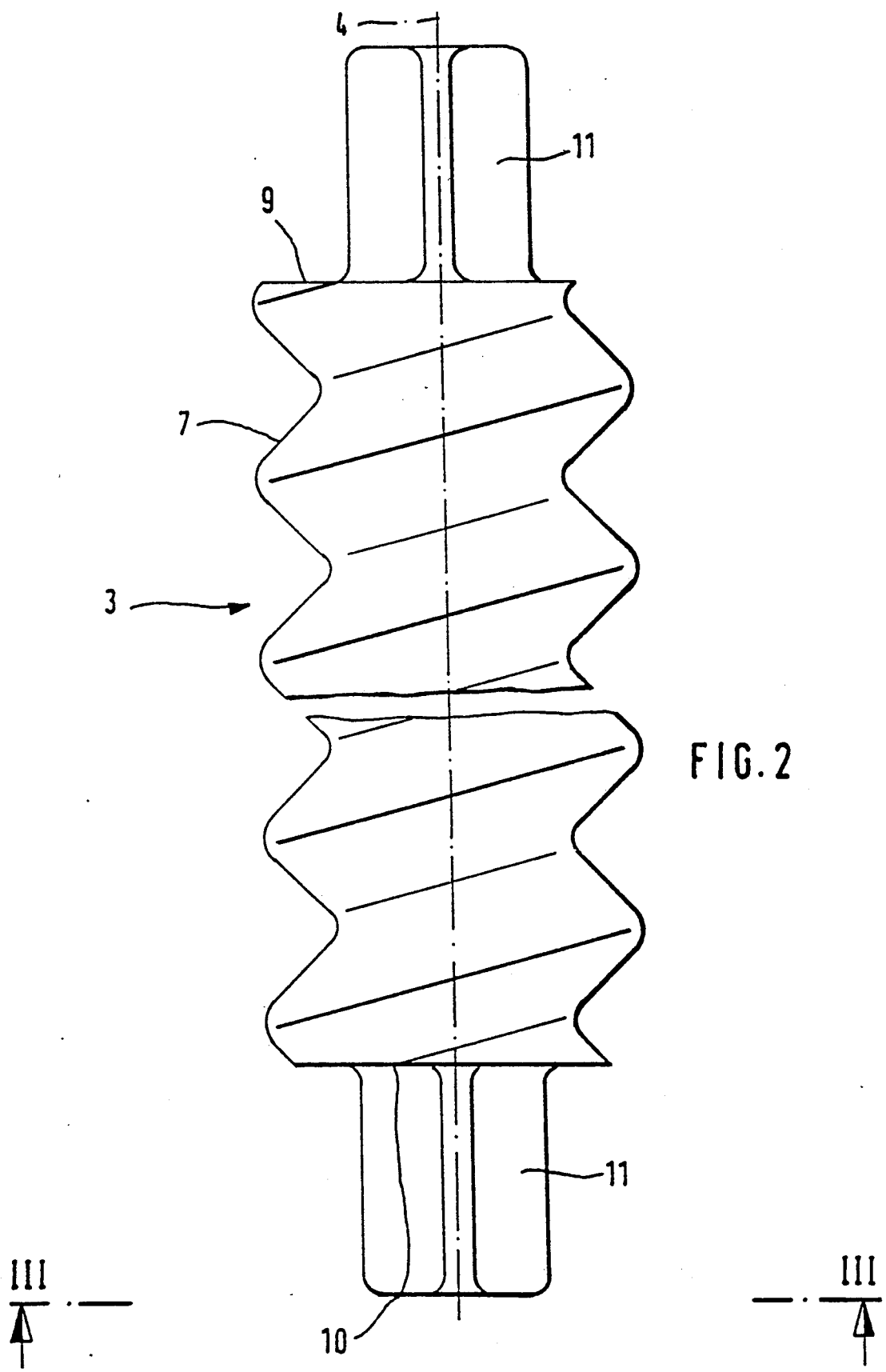
FIG. 2 is a side view of a rotor according to the invention.
Figure 3:
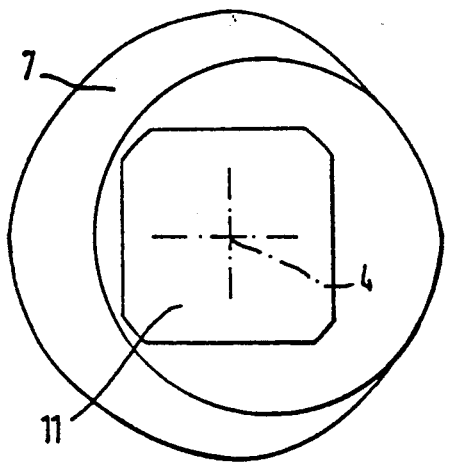
FIG. 3 is an end view of the rotor taken along the line III—III in FIG. 2.

The housing 1 consists for example of a metallic sleeve 6 whose internal surface carries an insert (not shown in the drawings) defining delivery chambers for the matter to be transported, here for example mortar, and cooperating with the screw profile 7 of the rotor 3 which is shown in FIG. 2. This insert consists for example of a wear-resistant rubber and is vulcanised to the internal surface of the sleeve 6.

The rotor 3 is made of a hardened steel which is particularly wear-resistant to abrasive attack, and comprises a screw profile, for example in the form of a continuous thread.

The internal contour of the insert which together with the sleeve 6 forms the stator is in a manner known per se formed as a coarse thread which, according to the eccentricity of the rotor 3 with its screw profile 7—seen in the axial direction—forms delivery chambers of substantially the same volume but of different form and orientation. Theoretically, by this means, each section formed by two thread turns of the screw profile 7 can be considered as a closed chamber, wherein, viewed in the direction of transportation 8, the pressure to be expected and consequently also the abrasive attack exerted on the rotor and stator increases. The rotor 3 is equipped at both end faces 9, 10 with square spigots 11 which extend in the direction of the longitudinal central axis 4. These square spigots are smaller, in terms of their external dimensions, than the core diameter of the rotor.

The square spigots 11 project from both ends of the sleeve 6 and serve for the connection of a driving unit which is connected by way of a jointed intermediate shaft. For example, with the indicated direction of conveyance 8, the input end is at the position 12, from which the square spigot 11 located here projects for the drive. The polygonal spigot located at the output or delivery end 13 in this case runs freely. In practice, with the transportation of mortar, a suitable tube can be arranged at the output end, or alternatively an intermediate container. In the latter case a stirrer or a comparable device can be fixed for example to the output-end square spigot 11. Alternatively the stirrer could be made detachable, as a result of which the mixing process which takes place in the intermediate container is improved.

Figure 4:
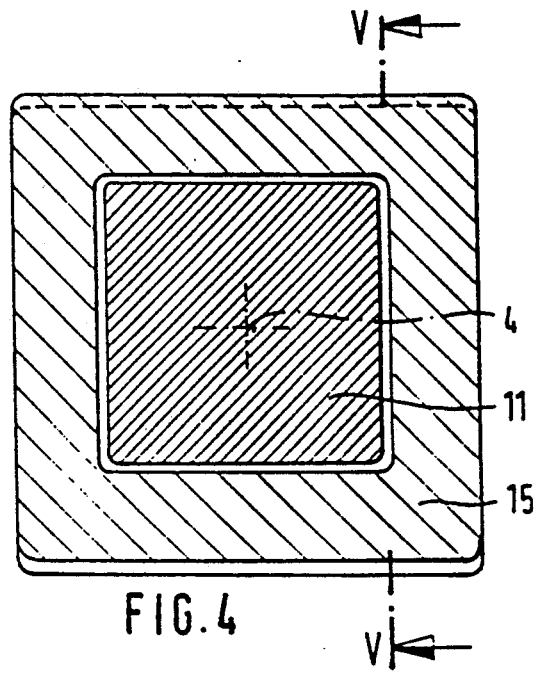
FIG. 4 is a sectional view of the end zone of the rotor taken along the line IV—IV in FIG. 5.
Figure 5:
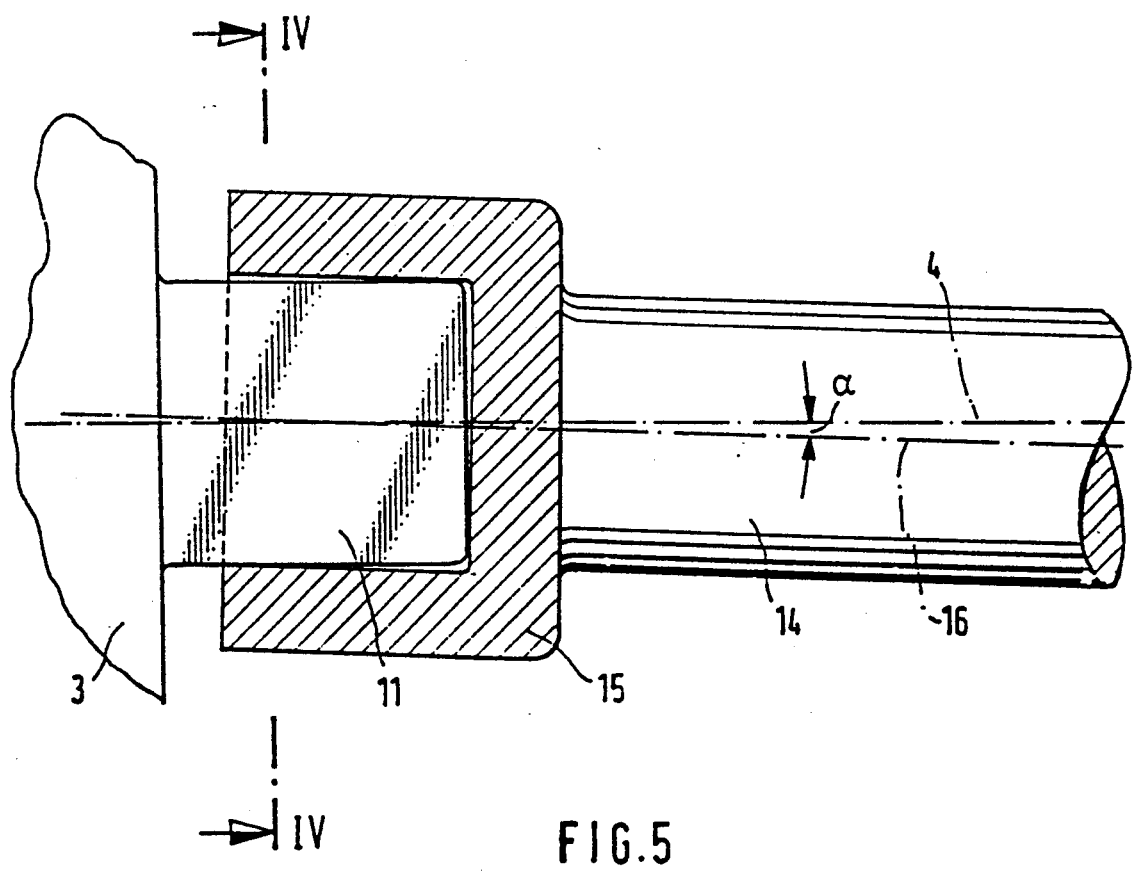
FIG. 5 is a sectional view of the end zone of the rotor taken along the line V—V in FIG. 4.

One particularly simple coupling possibility for the eccentrically rotating rotor 3 is shown in FIGS. 4 and 5, according to which the drive is effected by means of a square socket 15 formed on an intermediate shaft 14. The longitudinal central axis 16 which is common to the intermediate shaft 14 as well as to the square socket 15 is arranged at a small angle of inclination $\alpha$ to the longitudinal central axis 4, with the intermediate shaft 14 at its end remote from the said rotor likewise being connected to a rotor by means of a square spigot and a square socket. By means of the square spigots in combination with the square sockets associated with them one consequently has two couplings by means of which the intermediate shaft 14 is coupled on the one hand to the rotor 3 and on the other hand to a motor. The square socket is oversized in relation to the square spigot, in order that the eccentricity of the rotor can be balanced.

The main field of utilisation of the eccentric screw pump according to the invention is in the conveyance of prepared mortar of all types, namely gypsum, gypsum-chalk, basic plaster, chalk-cement or sealing plaster, although also including concreting mortar and flow coatings, with grain sizes up to 16 mm. They can additionally be used as pumps for foundation mortar and in injection grouting. In this connection, as already mentioned, one has increasing wear with increasing pressure, as a result of which the contour of the originally cylindrical rotor is increasingly worn away, particularly in the output-side end zone, thus resulting in a generally overall tapering shape for the rotor. If this wear has reached a level which can no longer be tolerated and which is adversely affecting the efficiency of the pump, then the rotor is removed axially from the likewise worn stator and is turned round and inserted into a new stator, so that what was previously the input-side rotor end is now inserted into the output-side end zone. This is suitable at the output-side end on the basis that only trifling demands are made on the rotor there, in order to ensure an adequate seal at the output-side end zone and consequently to ensure an adequate efficiency of the pump. The insertion of the worn end zone in the input-side part of the pump is in practice justified, since, on the basis of the low pressure created here, a nominal impairment of the efficiency need not be feared.

Figure 6:
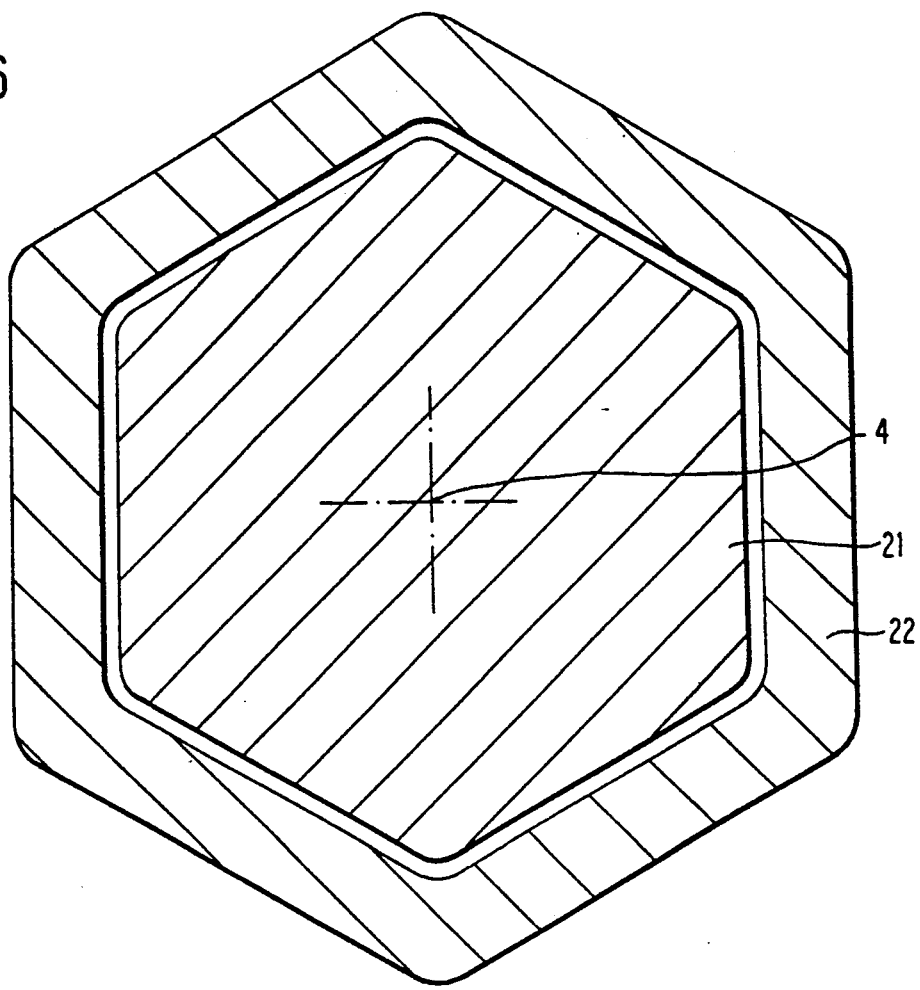
FIG. 6 is a view showing a cross section of a coupling device having a polygonal cross section.

As can be seen from FIG. 6 the rotor which has an axis 4 is provided at both ends with identical spigots 21 having a hexagonal cross section. They are received in corresponding hexagonal sockets 22 provided on the ends of a not shown intermediate shaft which is similar to the intermediate shaft of FIG. 5.

Figure 7:
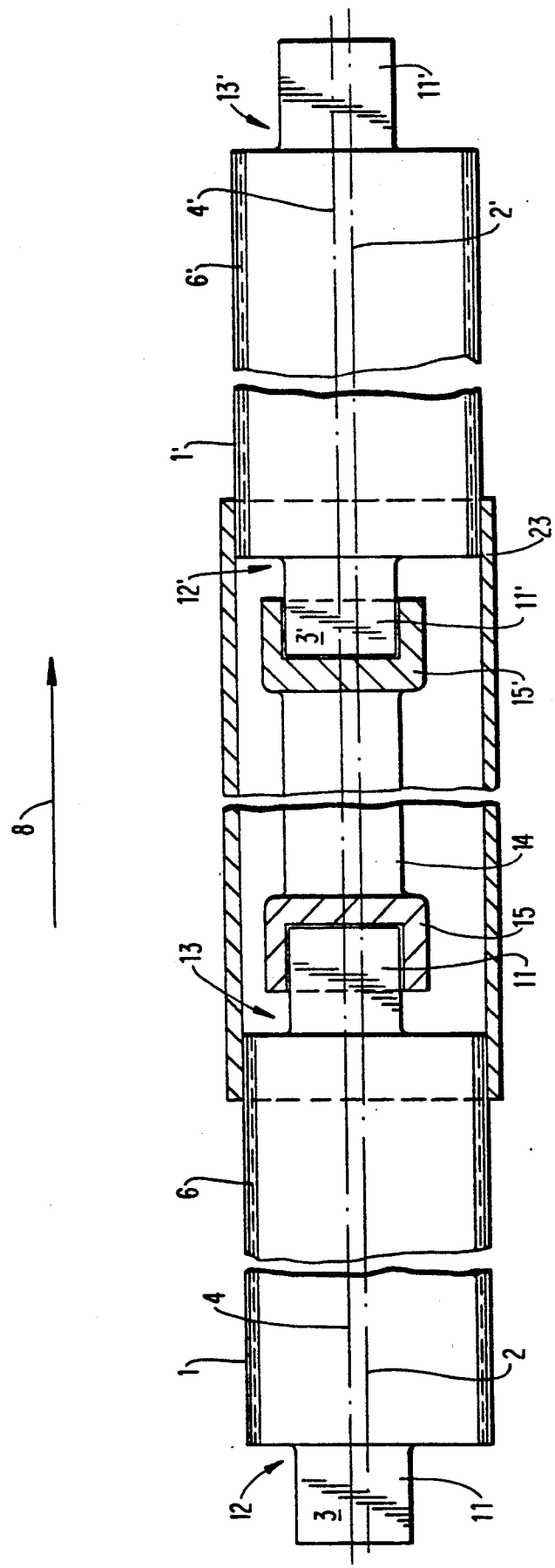
FIG. 7 is a view showing the inventive pump with two stators, and with rotors connected at their associated ends by two identical coupling devices.

Two eccentric screw pumps which are assembled to form a high pressure pump arrangement, are shown in FIG. 7. The housings 1, 1' of the pumps are coaxial with one another, and the opposite square spigots 11,11' are connected with one another by an intermediate shaft 14. A coupling device 23 sealingly covers the connecting region of the housings 1,1' from outside. Therefore the whole arrangement is assembled starting from its inlet side 12 of the first pump to its pressure side 13, the inlet side 12' of the second pump to its pressure side 13', and a medium to be transported flows during the operation in direction of the arrow 8. The coupling device 23 can have any construction. Compensation movements between the rotors 3,3' are possible due to the play between the square spigots 11,11' and the cooperating square sockets 15,15' of the intermediate shaft 14.

Figure 8:
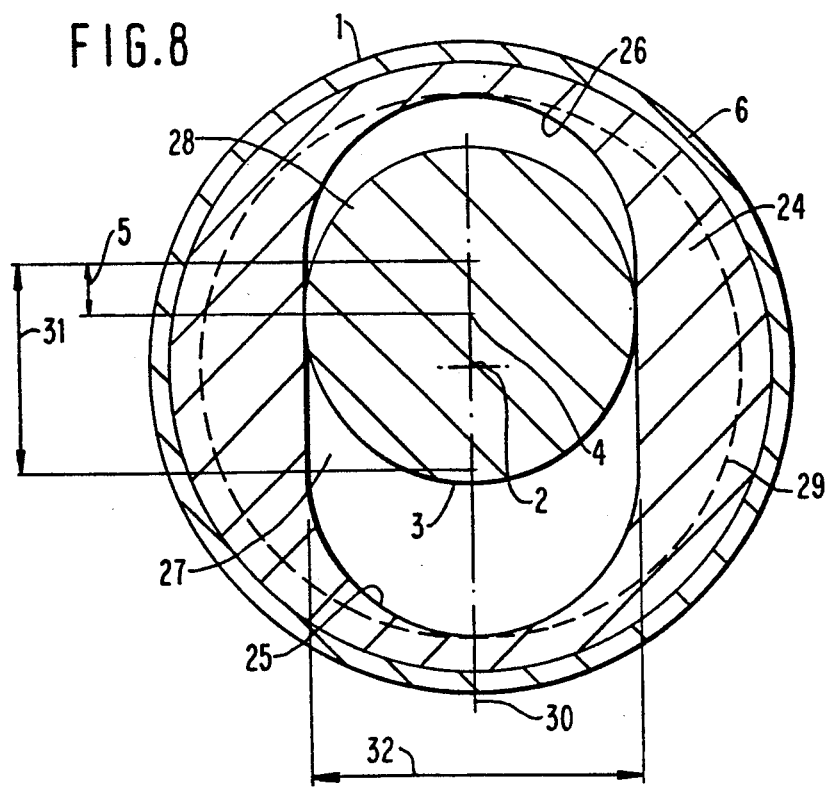
FIG. 8 is a view showing a section take along the line VIII—VIII in FIG. 1.

FIG. 8 shows the sleeve 6 of a cylindrical housing of the pump with a longitudinal central axis 2. An insert of wear resistant rubber 24 is provided at the inner side of the sleeve and has for example a steep double-thread inner contour. The inner contour of the insert 24 is an oval with two semi-circles 25,26 and a rectangle 27. The diameter of the semi-circles 25,26 corresponds to the diameter of the rotor cross section 28. One side of the rectangle 27 corresponds to the diameter of the rotor cross section 28, while the other side corresponds to four times the eccentricity 5. The broken line 29 corresponds to the projection of all inner countors of the insert 24 onto the plane of the drawings. The rotor 3 or the rotor cross section 28 performs during the operation of the pump a rectilinear, oscillating movement along the lien 30 over the stroke 31 between two extreme points which are spaced form one another by four times the eccentricity 5. The diameter of the rotor cross section is identified as 28.

The geometrical parameters produced due to the eccentric movement of the rotor of such pumps, especially the cooperation between the inner profile, the rotor cross section 28 and the eccentricity 5 are known and do not constitute the new features of the invention. FIG. 8 is provided only to illustrate the operation and the inner profile of the rubber insert.

It will be understood that each of the elements described above, or two or more together, may also find a useful application in other types of constructions differing from the types described above.

While the invention has been illustrated and described as embodied in an eccentric screw pump, it is not intended to be limited to the details shown, since various modifications and structural changes may be made without departing in any way from the spirit of the present invention.

Without further analysis, the foregoing will be fully reveal the gist of the present invention that others can, by applying current knowledge, readily adapt it for various applications without omitting features that, form the standpoint of prior art, fairly constitute essential characteristics of the generic or specific aspects of this invention.

What is claimed as new and desired to be protected by Letters Patent is set forth in the appended claims:

1. An eccentric screw pump, comprising a stator having an internal profile; a rotor having an external screw profile, operating with said internal profile of said stator, said rotor having a longitudinal central axis and two axial ends, a first coupling device provided at one of said ends of said rotor and a second coupling device provided at another of said ends of said rotor, said coupling devices being formed as multi-cornered spigets projecting form said ends of said rotor and axially outwardly beyond said ends of said stator, said spigets having central axes extending coaxially with respect to said longitudinal central axis of said rotor and having external dimensions which are not greater than the internal profile of said stator enabling a connection to a respective one of said ends of said rotor either to a drive system or to a further rotor.

2. An eccentric screw pump as defined in clam 1, wherein said stator includes a metallic sleeve with an internal surface and an insert arranged on said internal surface of said metallic sleeve and composed of wear resistant rubber.

3. An eccentric screw pump as defined in claim 1, wherein said coupling devices have a square cross-section.

4. An eccentric screw pump as defined in claim 1, wherein said coupling devices have a polygonal cross-section.

5. An eccentric screw pump as defined in claim 1, and further comprising a second stator, said stators being connected end to end sealingly to one another and each being provided with two such coupling devices, said coupling devices which mutually oppose each other in a connecting region of said stator being in engagement with each other.

6. An eccentric screw pump as defined in claim 1; and further comprising a rotatable shaft extending at a small angel of inclination relative to said longitudinal central axis of said rotor and provided with a socket connected with said first coupling device, said rotatable shaft being connectable with said drive system, said socket being oversized relative to said first coupling device so as to compensate for an eccentricity of said rotor.

* * * * *